April 14, 1959     M. J. MOUSSERON     2,882,201
(CYCLOHEXANONE-2')-YL-1 BETA-NAPHTHOL AND
COMPOSITIONS CONTAINING THE SAME
Filed April 21, 1958
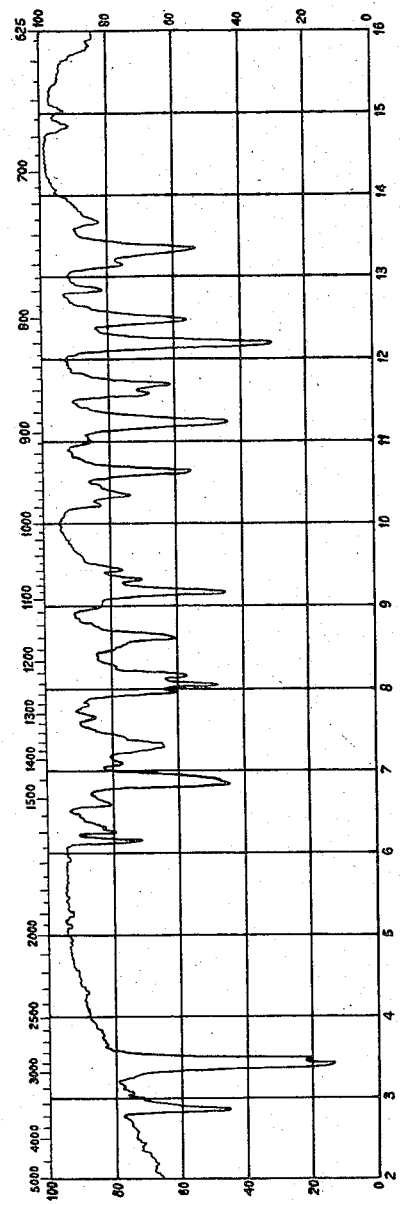

United States Patent Office 2,882,201
Patented Apr. 14, 1959

2,882,201

(CYCLOHEXANONE-2')-YL-1 BETA - NAPHTHOL AND COMPOSITIONS CONTAINING THE SAME

Max J. Mousseron, Montpellier, Herault, France, assignor to Etablissements Clin-Byla (Societe Anonyme), Paris, France, a company of France Application April 21, 1958, Serial No. 729,979

Claims priority, application France April 29, 1957

9 Claims. (Cl. 167—65)

This invention relates to compounds of the cyclohexyl naphthol series and more especially to (cyclohexanone-2')-yl-1 beta-naphthol and to derivatives thereof, as well as to their preparation.

It is desirable to search for substances for the relief of coughs which are less expensive than, for example, codeine and which do not suffer from the disadvantages of the latter.

In the course of a systematic study of a large number of substances for their activity in relieving coughs the applicant has discovered the cough-relieving properties of (cyclohexanone-2')-yl-1 beta naphthol

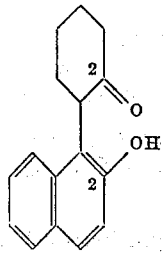

and the remarkable innocuousness of this substance.

The discovery of the cough-relieving properties of this nitrogen-free substance is very remarkable taking into account its formula which is very different from that of nitrogen-containing substances having cough-relieving properties which have been synthesised in an attempt to simulate the formula of codeine (for example "dextromethorphane") or the antispasmodic esters having a cough-relieving action such as caramiphen ethane sulphonate or "pentoxyverine."

(Cyclohexanone-2')-yl-1 beta-naphthol is a new substance which is therapeutically valuable as a sedative against coughs as well as a valuable intermediate in the synthesis of other substances, more especially its phenolic ethers and esters.

The present invention provides the new substance (cyclohexanone-2')-yl-1 beta-naphthol as well as its ethers, in particular its methyl ether, and its esters, in particular the benzoyl ester.

The invention also includes a process for the preparation thereof in which beta-naphthol is reacted at raised temperature with a halogeno-2-cyclohexanone, more especially 2-chloro-cyclohexanone, in the presence of an acceptor of hydrogen halides, and preferably in the presence of an inert diluent such as an ether, for example dioxane or anisol or a hydrocarbon such as toluene, xylene or tetrahydronaphthalene or a mixture of these substances.

As diluent it is advantageous to use a substance, such as xylene, which forms an azeotrope with the water liberated in the course of the reaction and by means of which it can be removed, as it is formed, in the vapours withdrawn from the reaction vessel: after condensation of the latter the heterogeneous liquid condensate may be allowed to settle out and the layer of diluent returned to the reactor.

As an acid acceptor for hydrogen halides it is convenient to use an alkaline material, more especially an alkali or alkali-earth metal carbonate preferably potassium carbonate.

(Cyclohexanone-2')-yl-1 beta-naphthol is obtained as a colourless crystalline powder which is odourless, tasteless and melts at 138–139° C. (capillary tube). It is insoluble in water, sparingly soluble in cold methanol and ethanol but very soluble in these solvents when hot as well as in the majority of organic solvents including hydrocarbons and ketones. It dissolves in the majority of the usual organic solvents especially when hot.

Since the keto and phenolic functions are more or less masked the following reasons which support the constitution given to this compound are given:

(a) It is a phenol or at any rate a pseudo-phenol, since, although insoluble in dilute caustic soda at room temperature (cyclohexanone-2')-yl-1 beta-naphthol is soluble in Claisen's solution (alcoholic of specific gravity 1.32 and also in hot 15% (caustic) soda. Moreover, it may be extracted from a benzene or ether solution thereof with Claisen's solution.

The phenolic function is inter alia revealed by the formation of a methyl ether in the following manner:

30 ml. of absolute alcohol is placed in a 100 ml. flask and 1.5 grams of sodium dissolved therein. When formation of the sodium ethylate is complete there is added 10 grams of (cyclohexanone-2')-yl-1 beta-naphthol, then 12 grams of methyl iodide and the whole heated under reflux for 2 hours. Subsequently the excess of iodide is removed under reduced pressure and the reaction mixture poured into iced water. The product which separates is dried and re-crystallised from alcohol (yield 95%). M.P.=104–106° C.

Analysis.—Found: C, 80.32%; H, 7.08%. Calculated: C, 80.28%; H, 7.3%.

The benzoic ester may also be obtained in the usual manner by the action of benzoyl chloride under alkaline conditions. The benzoyl ester of (cyclohexanone-2')-yl-1 beta-naphthol melts at 146–147° C.

Analysis.—Found: C, 80.25%; H, 5.95%. Calculated: C, 80.23%; H, 5.81%.

(b) It is a ketone but the ketonic function is masked since (cyclohexanone-2')-yl-1 beta-naphthol does not form a dinitrophenylhydrazone. The ketonic function is revealed after blocking the phenolic group. When this is done the methyl ether of (cyclohexanone-2')-yl-1 beta-naphthol gives by the usual method a 2.4-dinitro phenylhydrazone melting at 147–149° C.

Moreover, the keto group of the methyl ether of (cyclohexanone-2')-yl-1 beta-naphthol may be reduced (with hydrogen) under pressure in the presence of Raney nickel. There is thus obtained the corresponding alcohol which forms a phenyl urethane (M.P. 180–182° C.) by the action of phenyl isocyanate in petroleum ether.

The accompanying drawing shows the infra-red spectrum of (cyclohexanone-2')-yl-1 beta-naphthol in suspension in nujol (medicinal paraffin). In the drawing the upper abscissae indicates frequencies (cm.$^{-1}$). The lower abscissae indicates wavelengths in microns and the ordinates the transmission in percent.

A physiological study of (cyclohexanone-2')-yl-1 beta-naphthol has demonstrated its very low toxicity and that its therapeutic coefficient is very favourable.

Single dose toxicity: It has been impossible to find a lethal dose by oral administration to rats. No fatalities occurred when a dose of 4 grams per kilogram body weight of rat was administered orally.

Cumulative toxicity: No toxic symptoms were observed amongst rats to which (cyclohexanone-2')-yl-1 beta-naphthol had been given in a dosage of 300 mg per kilogram body weight per day for 13 months, Relief of coughs: The action of (cyclohexanone-2')-yl-1 beta-naphthol when orally administered was demonstrated on a dog which had been anaesthetised with chloralose by a comparison, before and after administration, of the exhaling spasms released by reflex action brought about either by bronchial stimulation (method of Yoshitoshi Kase (Jap. Jour. Pharmacol., 1952, vol. 2, page 7)) or by stimulation of the sinocarotid chemo-receptors with lobeline (method of Heymans, Compt. Rendus, Soc. Biol., 1931, vol. 106, page 469) or by stimulation of the pleura (method of Cross, Reunion Soc. Biol. Alger, November 1956).

The cough-relieving action has also been demonstrated on a white rat which had been caused to inhale acetic acid vapours.

(Cyclohexanone-2')-yl-1 beta-naphthol was found to be active in all these cases when orally administered in doses of 0.10 to 0.20 gram per kilogram body weight of animal.

Clinical trials have also confirmed the effectiveness of (cyclohexanone-2')-yl-1 beta-naphthol especially in combatting coughs arising from irritation of the upper respiratory ducts. It is readily tolerated and, in most cases, exerts a soothing action on the nervous system which may encourage sleep.

In the clinical trials (cyclohexanone-2')-yl-1 beta-naphthol has been used in an average dose of 4–6 tablets each containing 0.10 gram of the active substance per day for periods of from 4 days to 8 weeks.

Amongst the cases treated observations have been collected on 166 patients, males and females of all ages, suffering from pulmonary tuberculosis, acute or chronic pulmonary infections, persistent fits of coughing and nervous coughs.

The results obtained have been classified as follows:

Good results: when there has been a complete disappearance of the fits of coughing.

Partial results: when there has only been a diminution in the severity of the fits or a lessening of the frequency thereof.

No results: when there has been but little change in the functional symptomatology or the activity has only been shown over a short period.

Of the 166 patients treated good results were obtained with 109, partial results with 37 and no results with 20.

If these results are examined the cough-relieving activity of (cyclohexanone-2')-yl-1 beta-naphthol appears to be incontravertible in 65% of the cases, beneficial, though incomplete, results were obtained in 37 cases, which is 22%, and only 20 patients showed no improvement, which is 13%.

Detailed study of the results obtained in conjunction with the nature of the illness indicates that the action of (cyclohexanone-2')-yl-1 beta-naphthol is especially effective and reliable with coughs arising from reflex action through irritation of the upper respiratory passages. If the results have been less uniformly good and severe pulmonary sickness (severe bronchitis, pulmonary sclerosis, emphysema) they are sufficient to suggest that such treatment should be tried. In such cases one could await a sufficient improvement to give comfort to the patients whilst enabling the necessary draining of the bronchial tubes.

Tolerance has been excellent in all cases, neither has there been appreciable effect during passage through the intestines or on the respiratory organs or to the circulation.

It should be mentioned that in a majority of patients treated (cyclohexanone-2')-yl-1 beta-naphthol has exerted a soothing action upon the nervous system and, above all, has encouraged sleep. The hypnogenic effect is marked with patients taking two or three tablets at a time. It is therefore recommended when prolonged treatment is required only to give one tablet per day.

No case of habit-forming has been encountered. It has not been necessary to increase the doses of the substance during prolonged treatment in order to obtain a therapeutic result. Cessation of the treatment at the end of 1 to 6 weeks has not resulted in any organic or characteristic reaction.

(Cyclohexanone-2')-yl-1 beta-naphthol may in general be given together with a pharmacologically acceptable diluent, especially in the form of tablets containing 1–50 preferably 5 or 10, cgms. of active material, or in the form of an aqueous or aqueous-alcoholic suspension to be taken by the mouth, more especially in suspensions containing 0.5 to 20, preferably about 10% by weight, of the active material, or also in the form of suppositories each containing 1–40 cgms. of the active material, preferably 5 cgms. for children and 10 cgms. for adults.

The methods of administration given above are by way of example only and are not intended to limit the invention.

The tablets may contain binders, substances which facilitate the disintegration thereof and inert materials. Aqueous and aqueous-alcoholic suspensions may include surface active materials such as emulsifying agents. Suppositories may include natural or synthetic excipients of the usual kinds.

More particularly tablets may contain the active substance, that is to say (cyclohexanone-2')-yl-1 beta-naphthol in amounts of 1–50 cgms. preferably 5 or 10 cgms.; binders such as gelatine, natural and synthetic gums, as well as sugars in amounts of approximately 1–15% of the active substance; substances facilitating the disintegration of the tablets in contact with water such as corn starch or manioc starch, alginic acid, carbohydrates, gums and cellulose derivatives in amounts of the order of 10 to 50% of the active substance; and inert substances such as calcium carbonate, kieselguhr and tricalcium phosphate.

The following is one formula and a preferred method for making tablets of (cyclohexanone-2')-yl-1 beta-naphthol:

| | Gram |
|---|---|
| (Cyclohexanone-2')-yl-1 beta-naphthol | 0.10 |
| Excipient | 0.24 |
| Magnesium stearate | 0.01 |

The excipient is made up as follows:

| | Parts by weight |
|---|---|
| Lactose | 30 |
| Calcium carbonate | 5 |
| Tricalcium phosphate | 10 |
| Magnesium carbonate | 5 |
| Corn starch | 10 |
| Kieselguhr | 5 |
| Gum arabic | 15 |

The excipient may be prepared in granulated form by mixing the various dry ingredients and using an aqueous solution of the gum as binder. The product is dried, ground and sieved. The active material is likewise sieved through a No. 60 sieve and is mixed with the granulated excipient. Magnesium stearate is then added thereto as a lubricant. The resulting powder is formed into tablets on a machine: the tablets may be sugar coated.

Aqueous suspensions of (cyclohexanone-2')-yl-1 beta-naphthol are unavoidable on account of the insolubility of the product in water. It has been found that one can obtain a readily usable suspension by proceeding in the following manner: dispersion of an alcoholic solution of the active substance in an aqueous phase containing a suspending agent. It is also possible to disperse the finely divided active substance in an aqueous phase containing a suspending agent using an homogeniser. The emulsifying agents used may be such as Tween 80, inter-esterified oils and all edible emulsifying agents. The amount of active substance in the suspension may be from 0.5 to 20%, preferably about 10%.

A preferred formula and method of procedure are as follows:

| | Gram |
|---|---|
| (Cyclohexanone-2')-yl-1 beta-naphthol | 10 |
| Eethyl alcohol 95% by volume | 25 |
| Tween 80 | 5 |
| Distilled water to make 100 ml. | |

The active material is dissolved in the alcohol with gentle heating and the Tween 80 added to the resulting alcoholic solution. There is then added 25 ml. of distilled water. The alcohol is evaporated under reduced pressure. Finally, the ultimate volume is made up with distilled water. The product obtained is homogenised.

It has been found that suppositories provide an excellent method of administration since (cyclohexanone-2')-yl-1 beta-naphthol is easily absorbed in this way. The amount of active substance can be from 1 to 40 cgms. per suppository, preferably 5 cgms. per suppository for use by children and 10 cgms. per suppository for use by adults. The excipient may be cocoa butter of any other excipient available for this purpose, such as eutectic mixtures of esters of fatty acids.

The formula and preferred method are as follows:

| | Suppositories for adults, grams | Suppositories for children, gram |
|---|---|---|
| (Cyclohexanone-2')-yl-1 beta-naphthol | 0.10 | 0.05 |
| Cocoa butter | 3 | 1 |

The active substance is finely sieved and incorporated into the melted cocoa butter, then poured into moulds and cooled.

(Cyclohexanone-2')-yl-1 beta-naphthol may be used together with various other pharmaceutical materials currently in use which have a soothing action on coughs. The formulae of compositions using (cyclohexanone-2')-yl-1 beta naphthol may include soothing materials for coughs or antispasmodics such as codeine, ethyl morphine, narcotine and papaverine as well as synthetic materials which behave similarly: substances which render bronchial secretions fluid or expectorants such as: terpine, potassium guaiacol sulphonate, sodium benzoate, sodium citrate, ammonium chloride, plant extracts such as those of lobelia and ipecacuanha; and antihistamines such as "pyribenzamine" or N-(2-dimethyl-amino-1-propyl)phenothiazine.

The following examples illustrate the preparation of (cyclohexanone-2')-yl-1 beta-naphthol:

*Example 1*

A three-necked flask of 2 litres' capacity provided with a stirrer, condenser and thermometer is charged with 800 ml. of dry dioxan, 110 g. of potassium carbonate and 120 g. of beta-naphthol. Whilst stirring there is gradually added 120 grams of freshly distilled 2-chloro-cyclohexanone. When all the 2-chloro-cyclohexanone has been added the mixture is heated for about 14 hours: a sample of the reaction mixture, diluted with water, is then tested to determine if it is neutral to phenolphthalein, If it is still alkaline heating is continued until it is neutral. After cooling the reaction mixture is filtered, the filtrate is distilled under reduced pressure to recover the dioxan and the residue on the filter is dissolved in water and extracted with benzene, the extract being combined with the residue from the distillation of the dioxane. The whole is washed several times with 2% caustic soda until it is colourless, then with water and the benzene solution then dried over calcium chloride and the benzene finally removed under reduced pressure. There is obtained a crystalline product which is dried and washed with ether. Altogether there is obtained 100 grams of a pure product melting at 138–139° C. (capillary tube).

*Analysis.*—Found: C, 80.18; H, 6.7. Calculated: C, 80.0; H, 6.66%.

*Example 2*

A 2-litre flask provided with a stirrer is charged with 180 g. of beta-naphthol, 165 g. of potassium carbonate and 300 ml. of anisol. It is heated on an oil bath at 160° C. with stirring. After boiling for 0.5 hour, 180 grams of freshly distilled 2-chloro-cyclohexanone is added in portions over about 2 hours. It is then boiled for a further 2 hours, cooled to 80° C. and taken up in one volume of benzene and 2 volumes of water. The product which separated on cooling is re-crystallised from one volume of methanol. After two re-crystallisations there is obtained 115 grams of a product melting at 138–139° C.

*Example 3*

A 5-litre flask fitted with a mechanical stirrer, reflux condenser, thermometer and water separator is charged with 1000 grams of beta-naphthol, 700 grams of sodium carbonate and 1670 ccs. of xylene. The stirrer is set in motion and the whole raised to the boiling point in half an hour; the internal temperature rises to 147° C. 1000 grams of 2-chloro-cyclohexanone are added during 1.5 to 2 hours. When the addition is complete boiling and stirring are continued for a further 2 hours.

The xylene as it distils entrains the water liberated by the reaction (between the hydrogen halide and the sodium carbonate), the xylene-water vapour mixture is condensed, the water separating as a lower layer which is removed whilst the xylene is returned to the flask. The mixture is allowed to cool to 70–80° C. and 5 litres of water is added. On cooling further the product separates and is recrystallised from methyl alcohol. There is obtained about 1140 grams of cyclohexanonyl naphthol, M.P. 138–139° C.; yield 68%.

What I claim is:

1. (Cyclohexanone-2')yl-1-$\beta$-naphthol.
2. An aqueous suspension of (cyclohexanone-2')yl-1-$\beta$ naphthol.
3. A composition of matter in dosage unit form which comprises (cyclohexanone-2')yl-1-$\beta$-naphthol and an excipient.
4. A composition of matter in dosage unit form which comprises (cyclohexanone-2')yl-1-$\beta$-naphthol, and an excipient, a binder and a lubricant.
5. A suppository comprising (cyclohexanone-2')yl-1-$\beta$-naphthol and a suppositorial excipient.
6. A process for the treatment of cough which consists in administering (cyclohexanone-2')yl-1-$\beta$-naphthol to a human being through the gastro-intestinal tractus.
7. A method of producing (cyclohexanone-2')yl-1-$\beta$-naphthol, which comprises heating $\beta$-naphthol with a 2-halogenocyclohexanone in the presence of a carbonate selected from the class of alkali metal carbonates and alkali-earth metal carbonates.
8. The method of claim 7, said $\beta$-naphthol, 2-halogenocyclohexanone and carbonate being heated in an organic diluent selected from the class consisting of dioxane, anisol, toluene, xylene and tetrahydronaphthalene.
9. The method of claim 7, said $\beta$-naphthol, 2-halogenocyclohexanone and carbonate being heated to boiling in xylene in a reaction zone, and the vapors evolved being withdrawn from the reaction zone.

No references cited.